(12) United States Patent
Baehrle-Miller et al.

(10) Patent No.: US 10,179,573 B2
(45) Date of Patent: Jan. 15, 2019

(54) DRIVER ASSISTANCE SYSTEM WITH REDUCED ACTIVATION TIME

(71) Applicant: Robert Bosch GmbH, Stuttgart (DE)

(72) Inventors: Frank Baehrle-Miller, Schoenaich (DE); Dieter Blattert, Kirchheim/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 41 days.

(21) Appl. No.: 15/257,960

(22) Filed: Sep. 7, 2016

(65) Prior Publication Data

US 2017/0066419 A1    Mar. 9, 2017

(30) Foreign Application Priority Data

Sep. 8, 2015 (DE) .......... 10 2015 217 118

(51) Int. Cl.
| | |
|---|---|
| *B60T 7/12* | (2006.01) |
| *B60T 13/58* | (2006.01) |
| *B60T 13/66* | (2006.01) |
| *B60T 13/74* | (2006.01) |
| *F16D 55/226* | (2006.01) |
| *F16D 65/18* | (2006.01) |
| *B60T 8/171* | (2006.01) |
| *B60T 8/172* | (2006.01) |
| *B60T 8/24* | (2006.01) |
| *B60T 8/72* | (2006.01) |
| *F16D 121/04* | (2012.01) |

(Continued)

(52) U.S. Cl.
CPC ............... *B60T 7/12* (2013.01); *B60T 8/171* (2013.01); *B60T 8/172* (2013.01); *B60T 8/246* (2013.01); *B60T 8/72* (2013.01); *B60T 13/588* (2013.01); *B60T 13/662* (2013.01); *B60T 13/741* (2013.01); *F16D 55/226* (2013.01); *F16D 65/183* (2013.01); *B60T 2201/10* (2013.01); *B60T 2201/12* (2013.01); *F16D 2121/04* (2013.01); *F16D 2121/24* (2013.01); *F16D 2125/06* (2013.01); *F16D 2125/40* (2013.01)

(58) Field of Classification Search
CPC combination set(s) only.
See application file for complete search history.

(56) References Cited

U.S. PATENT DOCUMENTS

| | | | |
|---|---|---|---|
| 6,450,587 B1 * | 9/2002 | MacGregor ............... | B60T 7/10 303/89 |
| 2002/0092720 A1 * | 7/2002 | Schafer ................... | B60T 1/005 188/158 |

(Continued)

FOREIGN PATENT DOCUMENTS

DE    10 2013 218 401 A1    3/2015

*Primary Examiner* — Anne M Antonucci
*Assistant Examiner* — Renee LaRose
(74) *Attorney, Agent, or Firm* — Maginot, Moore & Beck LLP

(57) ABSTRACT

A method is disclosed for the operation of an automated parking brake of a motor vehicle with a hydraulic operating brake and an automated parking brake. The parking brake can adopt at least a disengaged position, an engaged position, and an intermediate position between the disengaged position and the engaged position. The method includes determining a parking variable representing a parking process of the motor vehicle, and bringing the parking brake into the intermediate position in response to the determined parking variable.

11 Claims, 2 Drawing Sheets

(51) Int. Cl.
*F16D 121/24* (2012.01)
*F16D 125/06* (2012.01)
*F16D 125/40* (2012.01)

(56) References Cited

U.S. PATENT DOCUMENTS

2008/0190718 A1* 8/2008 Klusemann .............. B60T 7/12
 188/161
2011/0181540 A1* 7/2011 Nakamura ............ G01C 21/26
 345/173

* cited by examiner

Fig. 2
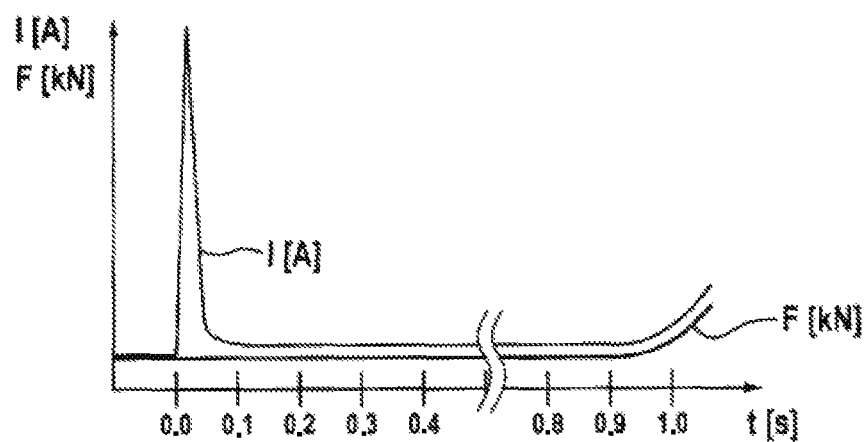
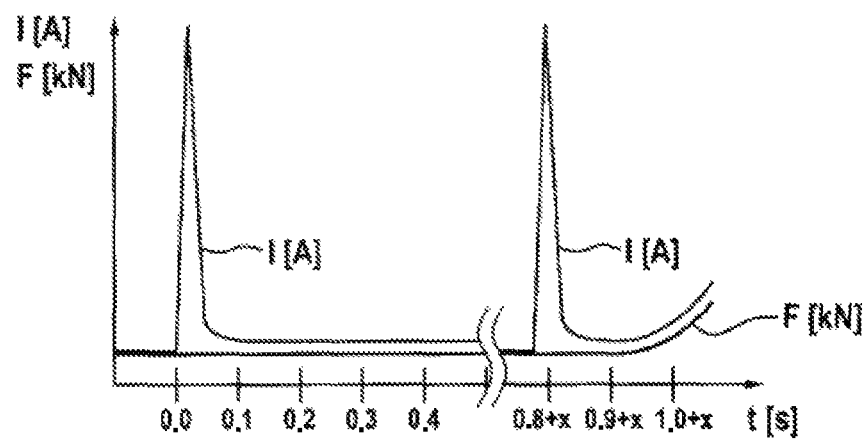

DRIVER ASSISTANCE SYSTEM WITH REDUCED ACTIVATION TIME

This application claims priority under 35 U.S.C. § 119 to patent application no. DE 10 2015 217 118.3, filed on Sep. 8, 2015 in Germany, the disclosure of which is incorporated herein by reference in its entirety.

The present disclosure concerns a method for the operation of an automated parking brake of a motor vehicle with a hydraulic operating brake and an automated parking brake, wherein the parking brake can adopt at least a disengaged position, an engaged position as well as an intermediate position, as well as a control unit and an automated parking brake for performing the method.

BACKGROUND

For example, the patent application DE 10 2013 218 401 A1 is known from the prior art. Said document concerns a method for the operation of a motor vehicle, wherein at least one autonomous or partially autonomous mode of the motor vehicle can be activated and the motor vehicle comprises an operating brake and a parking brake, characterized in that in response to a recognized operating state of the motor vehicle the parking brake is changed from a rest state to a predetermined operating state, wherein the predetermined operating state of the parking brake is determined such that the parking brake produces no braking effect or produces a braking effect that is significantly lower compared to full activation.

Parking brakes are adjusted when released, i.e. disengaged, such that there is no reaction of the parking brake on the operating brake system. In order to achieve this, the following requirements must be taken into account:

(1) A reduction of force occurs,
(2) the air gap must be opened (this is set by the seals of the brake piston; the brake piston is retracted slightly into the brake caliper for this)
(3) other effects, such as for example imbalance of the brake disk/disk run-out should not result in a brake torque and
(4) a safety margin is provided by which the parking brake mechanism is opened further. Said distances must be overcome when next re-engaging. In particular, the distances (2) through
(5), which define the entire force-free region. In relation to the overall application when engaging, approximately ½ to ⅔ of the entire activation time is required for this.

Furthermore, systems are known that enable partially automatic or fully automatic parking. Here, following the completion of the parking process, there is generally a change from holding hydraulically to holding (electro)mechanically. The handover from hydraulic holding to (electro)mechanical holding is relatively slow. The activation sequence, i.e. the required activation time, for automated electromechanical parking brakes generally requires 1 to 1.5 seconds. Said time is a function of the entire system, the setting position of the free travel (i.e. the actuator position in the disengaged state) and the voltage level. Until the parking brake is effective fully and to the required extent, hydraulic holding must be used. Otherwise there is a risk that the vehicle may roll away in the event of there being a suitable upslope or downslope. The feedback to the driver is therefor made with a suitable time delay.

SUMMARY

By contrast, the method according to the disclosure advantageously enables the application time to be significantly reduced in a manner that is perceptible by the driver. In this way the driver receives significantly faster feedback regarding the operation of the parking brake during an engagement process. Furthermore, a timely check is carried out of the operational readiness and the operability of the parking brake actuators.

The method according to the disclosure for the operation of an automated parking brake of a motor vehicle with a hydraulic operating brake and an automated parking brake, wherein the parking brake can adopt at least a disengaged position, an engaged position as well as an intermediate position between the disengaged position and the engaged position, is characterized in that a parking variable representing a parking process of the motor vehicle is determined and the parking brake is changed to the intermediate position in response to the determined parking variable.

This means that the parking brake is changed into an intermediate position between the disengaged position and the engaged position in response to a recognized parking situation. For this purpose, the recognition of a parking maneuver is carried out using a parking variable, wherein in response to a recognized parking maneuver the parking brake is changed into a specific operating state that lies between the rest state and the clamped parking state of the parking brake. The "disengaged position of the parking brake" means the rest position of the parking brake actuator. The "engaged position of the parking brake" corresponds to the parking position of the parking brake, i.e. the position of the parking brake actuator in which the necessary clamping force for holding the vehicle can be applied. Hereby in particular a clamping force is produced in order to hold the vehicle on a 20% or more gradient according to legal standards. The free travel and the air gap of the parking brake must first be overcome for this in order to enable any build-up of force at all. The "intermediate position of the parking brake" corresponds to a position of the parking brake actuator in which the actuator is moved from the rest position towards the parking position but said parking position has not yet been reached. By the activation of the parking brake and the positioning of the parking brake in the intermediate position, the application time for a subsequent actual clamping can be significantly reduced in a manner that is perceptible by the driver. This yields gains in both comfort and safety. Furthermore, by the pre-activation of the parking brake and the physical movement of the parking brake into the intermediate position, the readiness and operability are tested in advance of the actual build-up of force.

A parking process or a parking maneuver means any type of parking, for example parking in a parking space, unparking from a parking lot, etc. This can be an upcoming parking maneuver or a currently occurring parking process. The identification of the parking process is carried out by determining so-called parking variables. Parking variables can be derived from different data and sensor signals. The appropriate parking variable is obtained by summarizing and analyzing said data and signals. Such a parking variable indicates whether a parking process is occurring or is to be expected. In this connection the determination of the parking variable as well as the recognition of a parking process are carried out in particular in an automated manner. Likewise, suitable responses such as the activation of the parking brake can be carried out in an automated manner. The determination of the parking variables is carried out in particular directly in the vehicle, for example by means of a computer architecture.

In a preferred embodiment, the method is characterized in that for determining the parking variable an analysis is carried out of a geographic location of the motor vehicle and/or
of map material, in particular in connection with the geographic location of the motor vehicle.

This means that a suitable parking variable is determined depending on the geographical position of the motor vehicle. Where there is a suitable parking variable, it is concluded that there is a parking process. The geographical position can for example be determined by means of GPS coordinates or by means of other position data. In particular, a parking variable can be determined by a comparison of the current position of the vehicle and position data of parking options. The position data of the parking options can be stored on a memory medium in the vehicle and/or received over a radio link for this. The position data of parking options can for example include parking lots, underground car parks, parking garages as well as parking options on streets.

For example, using GPS and suitable map material stored in the vehicle, it can be recognized that the vehicle is not on a road but on a parking lot. If the vehicle now travels into such a region, then the parking brake is activated in order to bring the parking brake actuator into a position between the disengaged and engaged positions. By this means, the remaining travel of the parking brake to the engaged position of the parking brake is significantly reduced. If this is followed by wanting to park, a faster build-up of force is carried out. The feedback to the driver is thereby markedly faster. The unavailability of the system can also be identified earlier.

Besides fixed predetermined position data of parking options, there is of course also the possibility that the driver himself can store position data of further parking options that can subsequently be taken into account. Moreover, a type of "self-learning system" is also envisaged, wherein position data are stored and taken into account automatically if the driver has repeatedly parked at specific points or has parked his vehicle in unmarked areas. In this connection, these can for example be undesignated parking areas (for example private parking lots) or even "blind spots" of the map materials (for example company grounds). If it is subsequently recognized by means of GPS that the vehicle is in said region again, preliminary activation of the parking brake is carried out in order to bring said brake into the described intermediate position.

Of course, a plurality of variables can also be taken into account in order to define a suitable parking variable. This means that a plurality of variables will be analyzed to recognize a parking process. This advantageously enables improved reliability in the determination of a current parking process to be achieved. Furthermore, a supporting evaluation of a first variable can even be advantageously used by a further variable.

In an advantageous embodiment, the method is characterized in that for determining the parking variable an analysis is carried out of video data and/or
data of sound-based and/or radar-based systems and/or
vehicle functions, in particular the activation of a parking aid and/or an automated parking function.

Here it is to be understood that alternative or additional information can be taken into account in order to determine the parking variable and to determine or to estimate the presence of a parking process. For example, optical means in the vehicle can be used during the determination of the parking variable. In this connection, an analysis of the data of a vehicle camera enables determination of whether the vehicle is travelling into a car park for example. Sound-based and/or radar-based systems can also be used advantageously.

Besides the use of such environmental sensors, information relating to the vehicle itself or to the driver can also be used for this. Thus, for example, the activation of the parking aid by the driver is advantageously used as an indication of a parking process. In the case of an active parking aid, for example the region around the vehicle is measured by means of diverse sensors in order to find a suitable parking space. If such a space is detected, then the parking brake actuator can be controlled to the intermediate position and the free travel of the parking brake actuator can be significantly reduced. Said intermediate position is reached much faster than the vehicle can come to rest in the final position thereof. If there is subsequently a wish to park, a build-up of force is carried out immediately. The feedback to the driver is thereby markedly faster. Unavailability can also be indicated earlier. In the event of the activation of an automatic parking function, the proceed can essentially be as described for the parking aid. The difference, however, is that the driver no longer has to be in the vehicle during this. The driver is for example within viewing range of the vehicle and operates said vehicle by remote control. Wherein the remote control is only necessary for safety reasons and takes over the function to maintain the operation of the automatic parking. The longitudinal and lateral control of the vehicle is controlled by the vehicle itself.

In a preferred development, the method is characterized in that for determining the parking variable an analysis is carried out of a speed profile of the vehicle and/or
an operation of the turn indicator and/or
a wheel angle and/or a steering angle.

This means that further alternative or additional information can be taken into account in order to determine the parking variable and to determine or to estimate the existence of a parking process. In this connection for example, the speed profile of the vehicle can advantageously be taken into account. Here falling below a reference speed can be assessed as an indication of a parking process.

In particular, in combination with further factors, especially the factors indicated above, taking account of said information can achieve an improvement of the probability of recognition. In this sense, a parking process is only recognized for example if the vehicle is driven onto a parking lot and falls below a reference speed. In an alternative embodiment, a parking process is only recognized if the vehicle is travelling on a road with parking options, has fallen below a reference speed and it is confirmed by means of operation of the turn indicator that a parking space is to be approached. In a further advantageous alternative, a parking process is only recognized if it is additionally recognized by means of a steering angle or wheel angle that the parking space is actually being approached.

In one advantageous embodiment, the method is characterized in that the intermediate position is determined such that a shorter activation time is necessary in order to move the parking brake into the engaged position compared to the disengaged position of the parking brake.

This means that the parking brake is brought into an intermediate position between the disengaged position and the engaged position in response to a recognized parking situation, wherein the intermediate position is defined such that, compared to the rest position, a shorter activation time is necessary in order to bring the parking brake into the parking position. In the event of the reactivation of the parking brake, this enables a faster build-up of the necessary clamping force to advantageously take place. This provides both a gain in comfort owing to the rapid feedback to the driver and also a safety gain owing to the faster application of the parking brake.

For completeness it should be mentioned that the term "determined such that" is to be understood to mean that the parking brake is activated in such a way that the described effect is produced. Strictly speaking, for example the components of the parking brake are brought into a specific position by means of activation of the electromechanical actuator in order to achieve said effect.

In an alternative embodiment, the method is characterized in that the intermediate position is determined such that a significant part of the free travel of the parking brake is overcome relative to the disengaged position of the parking brake, in particular the entire free travel.

As already mentioned, the free travel and the air gap must first be overcome before a clamping force can be built up. The remaining period of time until the build-up of the clamping force is significantly reduced by the described embodiment. If there is subsequently a wish to park, a more rapid build-up of force is carried out. The feedback to the driver is markedly faster as a result. The unavailability of the system can also be identified sooner.

In a further alternative embodiment, the method is characterized in that the intermediate position is determined such that the parking brake produces a lesser braking effect compared to the engaged position of the parking brake.

This means that when determining a parking variable representing a parking process, the parking brake is brought into an intermediate position between the disengaged position and the engaged position, wherein the intermediate position is defined such that the wheel brake is already engaged. A first build-up of force occurs as a result. The force produced also causes a first braking effect. Said build-up of force or said braking effect is however reduced in relation to the final clamping force that is to be set, which is required to hold the vehicle firmly. The slight frictional torque can for example continue to brake the auto in the event of a failure of the operating brake system.

In one advantageous embodiment, the method is characterized in that the intermediate position is determined such that a frictional torque is produced by means of the parking brake but vehicle mobility is maintained.

In a preferred embodiment, the method is characterized in that the operability of the parking brake is checked while the parking brake is brought into the intermediate position.

As already described, for example in the event of a recognized parking process, the parking brake is activated in order to be brought into the intermediate position. By doing this, the actuators are activated by means of the activation in order to suitably displace the relevant components of the parking brake. This enables the operational readiness or the operability of the parking brake to be checked. Conventional tests mainly only relate to purely electrical testing, such as for example short-circuit or power interrupt tests. By using the described method, an extended test of the operational readiness can advantageously be carried out, for example a test of whether the motor turns during activation, etc.

In a possible embodiment, the method is characterized in that in the event of a recognition of a requirement to park a required brake force is immediately applied by means of the parking brake.

This means that the parking brake is activated in order to build up a required clamping force without a significant time delay. A requirement to park describes a requirement to hold the vehicle stationary, possibly also to stop the moving vehicle. In particular, this means firmly holding the vehicle for a longer period of time. For example, a parking brake demand can be activated by the driver. Such a demand is for example recognized if the driver the operates the parking brake pushbutton in the closing direction.

In one advantageous development, the method is characterized in that in the event of recognition of a final parking position of the motor vehicle, the parking brake is immediately activated and is further activated until the engaged position of the parking brake is reached.

In comparison to the previous embodiment, here the activation of the parking brake is carried out on recognizing a final parking position. Such a final parking position can for example be automatically recognized if the driver removes the ignition key and/or switches off the engine and/or leaves the vehicle.

In a possible embodiment, the method is characterized in that at least two different activation strategies for the parking brake can be set, wherein in a first activation strategy the parking brake is brought directly from the disengaged position into the engaged position and in a second activation strategy additionally an intermediate position is activated, wherein the selection of the activation strategy is carried out depending on the recognition of the parking variable representing a parking process of the motor vehicle.

The control unit according to the disclosure that is also provided for a motor vehicle with a hydraulic operating brake and an automated parking brake, wherein at least a disengaged position, an engaged position and an intermediate position of the parking brake can be set, is characterized in that the control unit comprises means to and is configured to perform a method as claimed herein, during normal use.

This means that the control unit is designed such that the parking brake is brought into an intermediate position between the disengaged position and the engaged position in response to a recognized parking situation. For this purpose, recognition of a parking maneuver is carried out using a parking variable, wherein the parking brake is brought into a specific operating state in response to a recognized parking maneuver, which state lies between the rest state and the clamped parking state of the parking brake. By the activation of the parking brake and the positioning of the parking brake in the intermediate position, the application time can be significantly reduced for a subsequent actual clamping in a manner that is perceptible to the driver. This yields both a gain in comfort and also a safety gain. Furthermore, by the advanced activation of the parking brake and the physical movement of the parking brake into the intermediate position, the operational readiness and the operability can be tested in advance of the actual build-up of force.

The automated parking brake according to the disclosure that is further provided for a motor vehicle with a hydraulic operating brake and an automated parking brake, wherein at least a disengaged position, an engaged position and an intermediate position of the parking brake can be set, is characterized in that the parking brake comprises means to and is configured to perform a method as claimed herein, during normal use.

This means that the parking brake is designed in order to be able to be brought into an intermediate position between the disengaged position and the engaged position in response to a recognized parking situation. For this purpose, recognition of a parking maneuver is carried out using a parking variable, wherein the parking brake is brought into a specific operating state in response to a recognized parking maneuver, which state lies between the rest state and the clamped parking state of the parking brake. By the activation of the parking brake and the positioning of the parking brake in the intermediate position, the application time in the event of a subsequent actual clamping can be significantly reduced in a manner that is perceptible to the driver. This yields both gain in comfort and also a safety gain. Furthermore, owing to the advance activation of the parking brake and the physical movement of the parking brake into the intermediate position, the operational readiness and operability can be tested in advance of the actual build-up of force.

BRIEF DESCRIPTION OF THE DRAWINGS

It should be mentioned that the features mentioned individually in the description can be combined with each other in any technically meaningful manner and represent further configurations of the disclosure. Further features and functionality of the disclosure are revealed by the description of exemplary embodiments using the accompanying figures.

In the figures:

FIG. 2 shows diagrams of a typical current profile and force profile for a conventional activation of the parking brake (upper diagram) as well as for the activation according to the disclosure of the parking brake (lower diagram).

DETAILED DESCRIPTION

Figure 1:
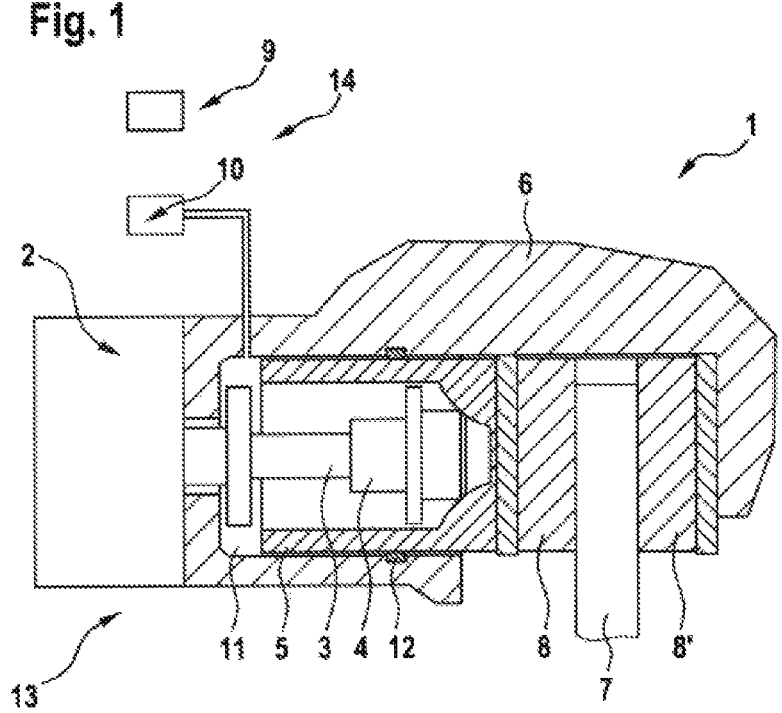
FIG. 1 shows a schematic sectional view of a brake device with an automatic parking brake of a "motor on caliper" construction.

FIG. 1 shows a schematic sectional view of a brake device 1 for a vehicle. The brake device 1 comprises an automated parking brake 13 (also known as an automatic parking brake or automated parking brake, APB in abbreviated form), which can exert a clamping force for holding the vehicle stationary by means of an actuator 2 (brake motor). For this purpose, the actuator 2 of the parking brake 13 drives a spindle 3 that is supported in an axial direction, in particular a threaded spindle 3. On the end thereof that is remote from the actuator 2, the spindle 3 is provided with a spindle nut 4 that is in contact with the brake piston 5 when the automated parking brake 13 is in the clamped state. In this way, the parking brake 13 electromechanically transfers a force to the brake linings 8, 8' or the brake disk 7. During this the spindle is in contact with an inner end face of the brake piston 5 (also known as the rear side of the brake piston crown or inner piston crown). The spindle nut 4 is shifted in the axial direction during a rotary motion of the actuator 2 and a resulting rotary motion of the spindle 3. The spindle nut 4 and the brake piston 5 are supported in a brake caliper 6 that engages around a brake disk 7 like a pair of tongs.

Respective brake linings 8, 8' are disposed on both sides of the brake disk 7. In the event of a clamping process of the brake device 1 by means of the automated parking brake 13, the electric motor (actuator 2) rotates, whereupon the spindle nut 4 as well as the brake piston 5 are moved in the axial direction towards the brake disk 7 in order to produce a predetermined clamping force between the brake linings 8, 8' and the brake disk 7. Owing to the spindle drive and the self-locking associated therewith, a force that is produced by the parking brake 13 by means of activation of the electric motor also continues to be maintained in the event of termination of the activation.

The automated parking brake 13 as shown is for example in the form of a "motor on caliper" system and is combined with the operating brake 14. This could also be considered to be integrated within the system of the operating brake 14. Both the automated parking brake 13 and also the operating brake 14 engage the same brake piston 5 as well as the same brake caliper 6 in order to exert a brake force on the brake disk 7. However, the operating brake 14 comprises a separate actuator 10. The operating brake 14 is configured in FIG. 1 as a hydraulic system, wherein the actuator 10 can be represented by the ESP pump or a so-called iBooster. In the case of service braking, a predetermined clamping force is built up hydraulically between the brake linings 8, 8' and the brake disk 7. In order to build up a brake force by means of the hydraulic operating brake 14, a medium 11, in particular an essentially incompressible brake fluid 11, is compressed in a fluid chamber bounded by the brake piston 5 and the brake caliper 6. The brake piston 5 is sealed relative to the surroundings by means of a piston sealing ring 12.

The activation of the brake actuators 2 and 10 is carried out by means of an end stage, i.e. by means of a control unit 9, which can be for example a control unit of a vehicle dynamics system, such as an ESP (Electronic Stability Program) or another control unit.

In the event of the activation of the automated parking brake 13, first the free travel or the air gap must be overcome before a brake force can be built up. For example, the distance that the spindle nut 4 must overcome by the rotation of the spindle 3 in order to come into contact with the brake piston 5 is referred to as the free travel. The distance between the brake linings 8, 8' and the brake disk 7 in disk brake systems of motor vehicles is referred to as an air gap. Said process generally lasts a relatively long time in relation to the entire activation, in particular with the automated parking brake 13. At the end of such a preparatory phase, the brake linings 8, 8' are in contact with the brake disk 7 and the build-up of force starts with a further activation. FIG. 1 shows the state with the free travel and air gap already overcome. The brake linings 8, 8' are hereby in contact with the brake disk 7 and all the brakes, i.e. the parking brake 13 and also the operating brake 14, can immediately build up a brake force at the corresponding wheel in the event of a subsequent activation. The descriptions of the air gap also apply similarly to the operating brake 14, wherein however, owing to the highly dynamic pressure build-up, overcoming free travel represents a shorter time than with the parking brake.

FIG. 2 shows diagrams of a typical current profile I [A] and force profile F [kN] against time t [s]. In this case, the upper diagram shows a typical current profile I and force profile F for a conventional activation. As a result, initially the parking brake actuator is activated. This causes a switch-on peak in the current profile I. Subsequently the free travel is overcome, wherein still no rise in the clamping force occurs. The total duration until a build-up of force amounts to approximately 1 second. Depending on the voltage and the free travel covered, the activation time t that is required for this can vary upwards or downwards.

The lower diagram shows a typical current profile I and force profile F for a possible configuration of the activation of the parking brake according to the disclosure. In contrast to the upper diagram however, the initial activation is not carried out when a clamping force is actually required, but in advance when a parking process is recognized. In the same way, activation of the parking brake actuator is carried out with a corresponding switch-on peak in the current profile I. However, before a build-up of force is carried out, the parking brake actuator is turned off again. A clamping force is therefore not yet available. The free travel of the parking brake is however significantly reduced. The parking brake actuator remains in said intermediate position during the parking process. If the parking process is terminated, a re-activation is carried out. This can be seen in the lower diagram at the second switch-on peak of the current I. Owing to the significantly reduced free travel, a rise in the force F can be achieved after a very short activation time. The latent period between recognition of a parking process and the end of a parking process can require several seconds (for example 0<x<20 seconds). Accordingly, the second activation is carried out at a later point in time, as illustrated on the time axis in the lower diagram.

What is claimed is:

1. A method for the operation of an automated parking brake of a motor vehicle including a hydraulic operating brake and an automated parking brake, the parking brake configured to adopt at least a disengaged position, an engaged position, and an intermediate position between the disengaged position and the engaged position, the method comprising:
   determining the intermediate position such that the parking brake produces a lesser braking effect compared to the engaged position of the parking brake;
   determining a parking variable representing a parking process of the motor vehicle with a control unit; and
   bringing the parking brake into the intermediate position in response to determining the parking variable.

2. The method according to claim 1, wherein determining the parking variable comprises:
   carrying out an analysis of at least one of a geographic location of the motor vehicle and a map material.

3. The method according to claim 1, wherein determining the parking variable comprises:
   carrying out an analysis of at least one of video data, data of sound-based and/or radar-based systems, vehicle functions, and activation of a parking aid and/or an automated parking function.

4. The method according to claim 1, wherein determining the parking variable comprises:
   carrying out an analysis of at least one of a speed profile of the motor vehicle, an operation of a turn indicator, and a wheel angle and/or a steering angle.

5. The method according to claim 1, further comprising:
   determining the intermediate position such that a frictional torque is produced by the parking brake, but a mobility of the mobility vehicle is maintained.

6. The method according to claim 1, further comprising:
   checking operability of the parking brake while the parking brake is brought into the intermediate position.

7. The method according to claim 1, further comprising:
   immediately applying a required brake force with the parking brake in response to a recognition of a requirement to park.

8. The method according to claim 1, further comprising:
   immediately activating the parking brake and further activating the parking brake until the engaged position of the parking brake is reached in response to recognizing a final parking position of the motor vehicle.

9. The method according to claim 1, further comprising:
   setting at least two different activation strategies for the parking brake,
   wherein a first activation strategy brings the parking brake directly from the disengaged position into the engaged position,
   wherein in a second activation strategy an intermediate position is additionally activated, and
   wherein selection of the activation strategy is carried out depending on recognition of the parking variable representing the parking process of the motor vehicle.

10. A method for the operation of an automated parking brake of a motor vehicle including a hydraulic operating brake and an automated parking brake, the parking brake configured to adopt at least a disengaged position, an engaged position, and an intermediate position between the disengaged position and the engaged position, the method comprising:
    determining the intermediate position such that a shorter activation time is necessary in order to change the parking brake to the engaged position compared to the disengaged position of the parking brake;
    determining a parking variable representing a parking process of the motor vehicle with a control unit; and
    bringing the parking brake into the intermediate position in response to determining the parking variable.

11. A method for the operation of an automated parking brake of a motor vehicle including a hydraulic operating brake and an automated parking brake, the parking brake configured to adopt at least a disengaged position, an engaged position, and an intermediate position between the disengaged position and the engaged position, the method comprising:
    determining the intermediate position such that a significant part of a free travel of the parking brake is overcome compared to the disengaged position of the parking brake or the free travel of the parking brake is fully overcome;
    determining a parking variable representing a parking process of the motor vehicle with a control unit; and
    bringing the parking brake into the intermediate position in response to determining the parking variable.

* * * * *